H. SEIBEL.
PNEUMATIC SEAT.
APPLICATION FILED MAY 7, 1917.
1,288,445.
Patented Dec. 17, 1918.
3 SHEETS—SHEET 1.
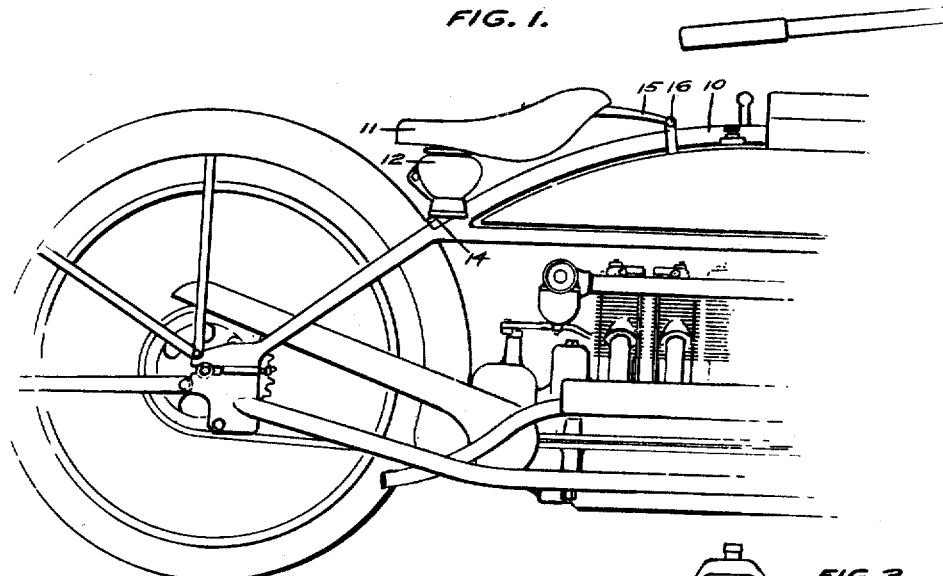
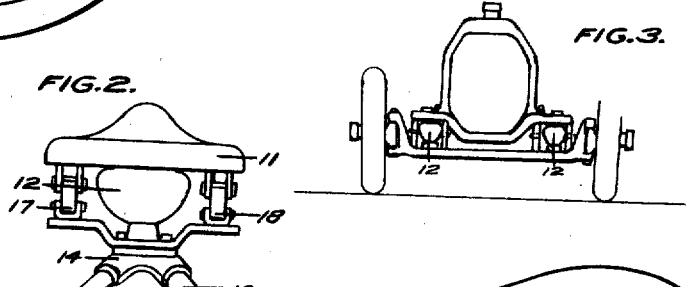
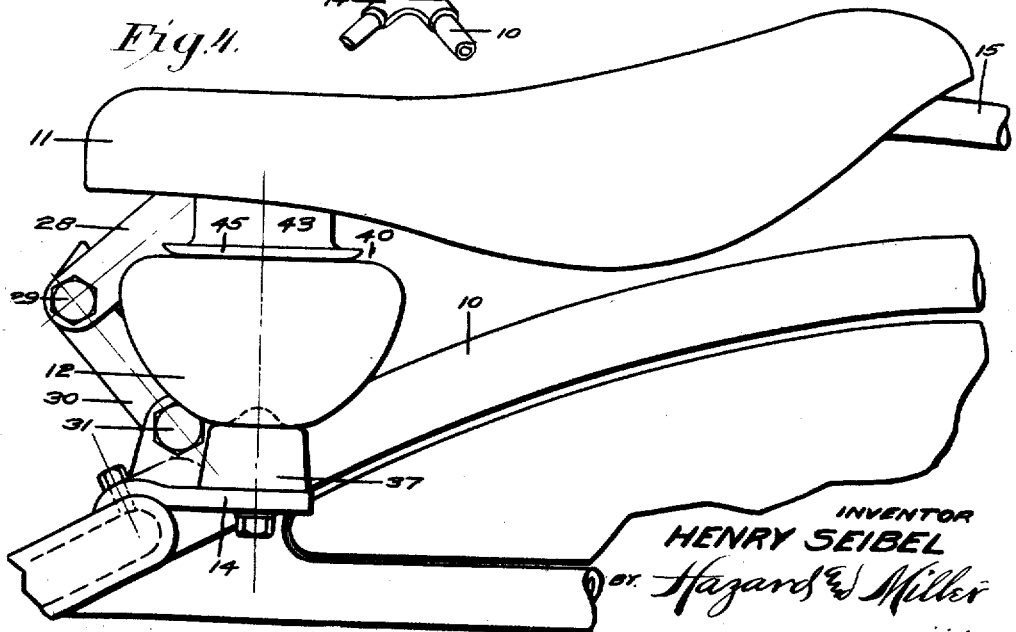
INVENTOR
HENRY SEIBEL
by Hazard & Miller
ATT'YS.

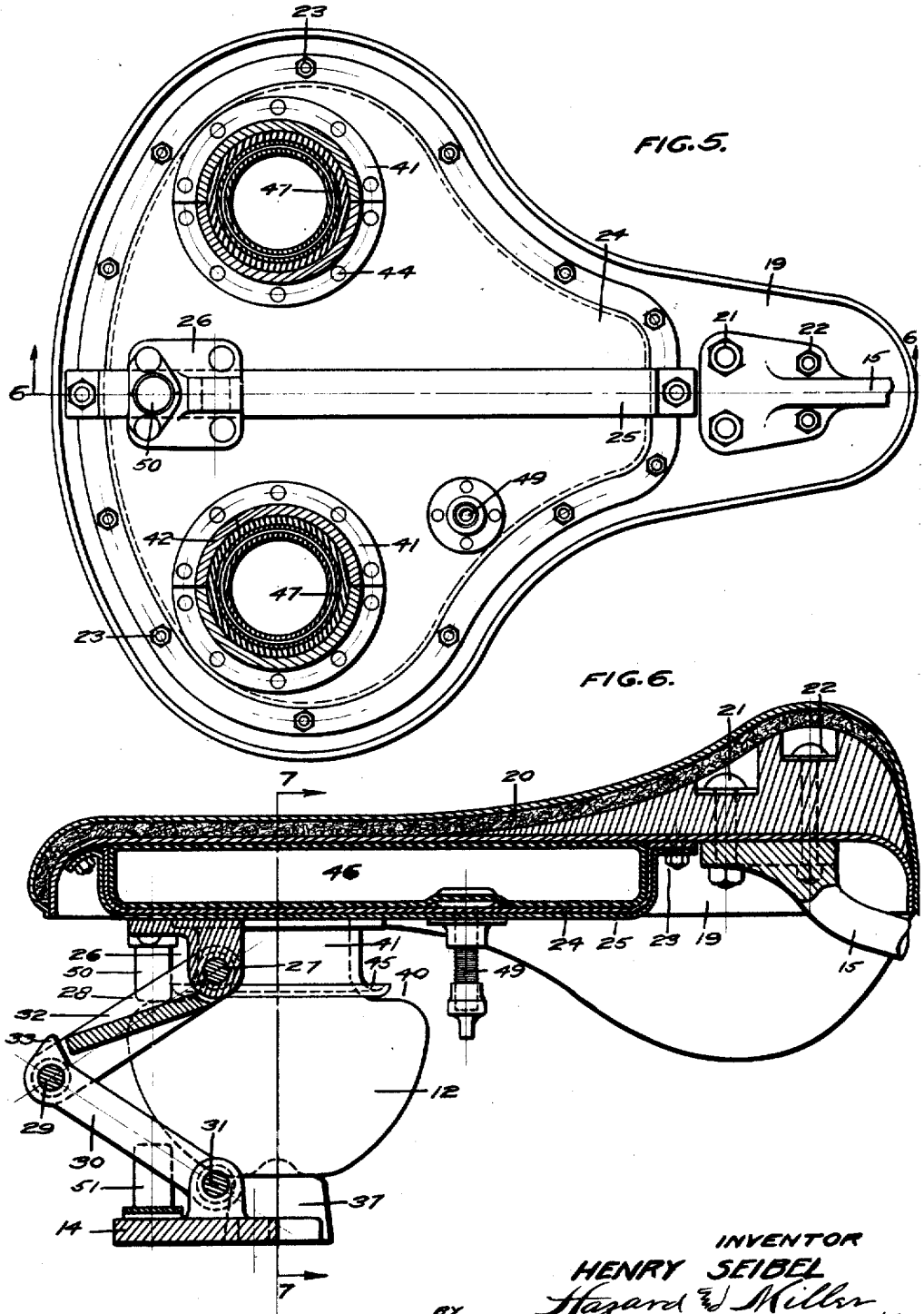

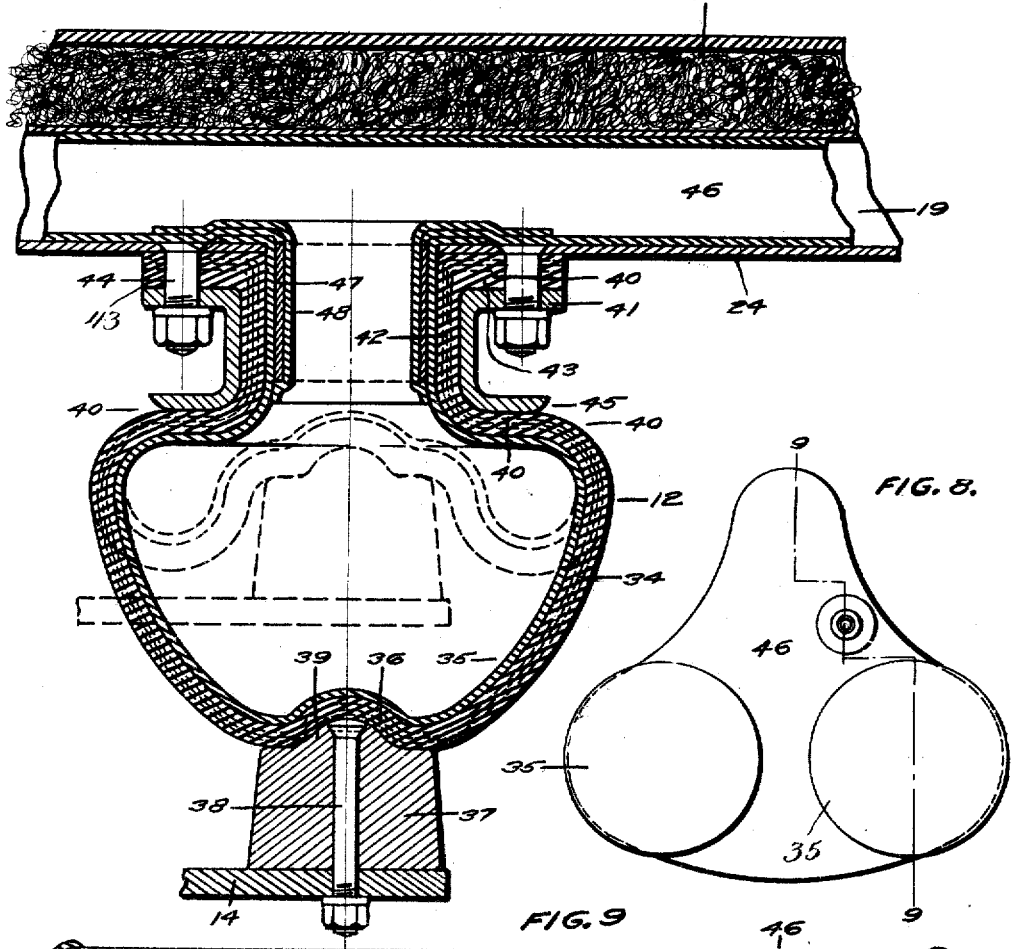

UNITED STATES PATENT OFFICE.

HENRY SEIBEL, OF LOS ANGELES, CALIFORNIA, ASSIGNOR TO UNITED AIR SPRING COMPANY OF ARIZONA, OF PHOENIX, ARIZONA, A CORPORATION OF ARIZONA.

PNEUMATIC SEAT.

1,288,445.  Specification of Letters Patent.  Patented Dec. 17, 1918.

Application filed May 7, 1917. Serial No. 167,026.

*To all whom it may concern:*

Be it known that I, HENRY SEIBEL, a citizen of the United States, residing at Los Angeles, in the county of Los Angeles and State of California, have invented new and useful Improvements in Pneumatic Seats, of which the following is a specification.

This invention relates to a pneumatic support or cushion and particularly pertains to a motorcycle seat.

Considerable difficulty has been experienced in incorporating pneumatic cushions or supports in vehicle construction. This has been due in most cases to the trouble encountered in properly building a pneumatic cushion which would stand constant strain and which would not burst or become distorted under such strain, at the same time furnishing a resilient support for the load which it was intended to carry. It is the principal object of this invention to provide a pneumatic support or cushion which is so designed and constructed as to overcome the above mentioned difficulties and which will act in an effective manner to absorb the constant vibration produced by a vehicle during its travel and also to overcome sudden shock delivered to the vehicle body.

Another object of this invention is to provide a pneumatic cushion having an outer casing so designed as to be very sensitive to slight shock without imparting movement to the frame of the vehicle and which, when required, will compress in a manner to absorb extreme and violent blows.

Another object of this invention is to provide a pneumatic support which is fitted with an integrally formed air reservoir by which the supporting cushions may be inflated and maintained in an inflated condition, said reservoir and cushions being of unitary construction, this construction being especially adapted for use with motorcycle seats, as particularly illustrated in the drawings.

Another object of this invention is to provide a pneumatically supported motorcycle seat upon which the pneumatic support is detachably secured, said seat being so reinforced as to withstand the expansion of the inflating reservoir when compressed.

Another object of this invention is to provide a motorcycle seat which is provided with shackles adapted to limit the upward movement of the seat, and rebound bumpers provided to resiliently limit the downward movement of the seat.

It is a further object of this invention to provide a pneumatically supported motorcycle seat, all of the parts of which may be separated and re-assembled as desired without difficulty, thus making it easy to interchange or repair the parts when necessary.

Other objects will appear hereinafter.

The invention is illustrated, by way of example, in the accompanying drawings in which:

Figure 1 is a view in side elevation illustrating a fragmentary portion of a motorcycle upon which is mounted the pneumatically supported seat with which the present invention is concerned.

Fig. 2 is a small view in rear elevation illustrating one form of the seat.

Fig. 3 is a small view in front elevation illustrating the pneumatic supports as applied to the axle of a motor vehicle.

Fig. 4 is an enlarged view in side elevation illustrating the preferred form of the motorcycle seat.

Fig. 5 is a view in plan illustrating the under face of the motorcycle seat as shown in Fig. 4, and particularly discloses the design of the seat when a dual supporting system is used.

Fig. 6 is a view in longitudinal section as seen through the seat on the line 6—6 of Fig. 5, said view particularly disclosing the formation of the air reservoir as well as the shackles by which the seat is held to the motorcycle frame.

Fig. 7 is an enlarged view in section as seen on the line 7—7 of Fig. 6, and as particularly illustrating the detail formation of one of the pneumatic supporting elements.

Fig. 8 is a view in plan illustrating the inner casing or reservoir of the pneumatic support.

Fig. 9 is a fragmentary view in section as seen on the line 9—9 of Fig. 8 and more particularly illustrates the inner casing.

Referring more particularly to the drawings, 10 indicates the frame of a motorcycle. Mounted upon the frame is a seat 11 here shown as supported upon pneumatic supports 12. In the preferred form of the invention two supports are used while in the modification as shown in Fig. 2 a single support is used. The pneumatic supports rest upon a bracket 14 secured to the frame and by means of which the rear of the saddle is supported. The forward end of the saddle is provided with a horn 15 mounted by a pin 16 to the frame. A pair of shackles 17 and 18 also are provided to secure the rear of the seat to the frame and limit its upward movement.

The saddle may be of any desired configuration and is here shown as formed with a metal sub-frame 19 upon which upholstering and an outer cover 20 are positioned. This sub-frame is preferably pressed from a single sheet of metal to the configuration disclosed in Fig. 5 of the drawings, having a down-turned marginal flange which extends around the entire seat, as shown in Fig. 6. The horn 15 is fastened to the forward end of the sub-frame and is bolted by means of bolts 21 and 22. Mounted beneath the sub-frame and secured thereto by a series of bolts 23 is an air reservoir case 24 which substantially conforms to the configuration of the seat and terminates with the forward end adjacent the end of the horn 15. This case is reinforced longitudinally by a strap 25 extending across the case and adapted to prevent its distortion under the influence of internal pressure and expansion.

A shackle bracket 26 is mounted at the rear of said case to bear upon the reinforcing strap 25. This bracket is riveted in place and is fitted with a pivot pin 27 upon which an upper shackle link 28 is pivotally mounted. The opposite end of this shackle link is provided with a shackle pin 29 to which the lower shackle link 30 is mounted. This link in turn is pivotally connected by a pin 31 to the frame bracket 14 previously described. As shown in Fig. 6, under normal conditions the pivot pins 27 and 31 are in vertical alinement. The upper shackle link is formed with two parallel side members which are united by a central web 32. This web acts as a stop for the shackle as it is in the arcuate path of travel of lug 33 formed upon the end of the lower shackle link 30 and projecting upwardly above the shackle pin 29. It will be evident that as the two links move toward a vertically alined position the lug 33 will encounter the end of the web 32 and will thus limit the upward movement of the seat in a positive manner.

It will be understood that by mounting the seat in pivotal relation to the fixed pivot pin 16 and permitting it to have limited radial movement in relation to that pin by means of the shackles, the seat will be yieldably secured in position. As shown in the drawings, the seat, when so mounted, is resiliently supported by the supporting members, as indicated by the numeral 12. Reference being had to Fig. 7 of the drawings, it will be seen that each of these members is composed of an outer casing 34 and an inner lining 35, or bladder. The outer casing is formed preferably of rubber and fabric while the inner lining is formed of rubber which is leak-proof. Especial attention is directed to the exact configuration of the outer casings of the supporting elements. These elements are here shown as having side walls which are substantially conical and each element terminates at the small lower end of the casing with a depression 36 by which the element is seated upon a deformer 37 secured by a bolt 38 to the mounting bracket 14. This deformer is formed with a protrusion 39 which corresponds in contour to the depression in the end of the supporting element within which it seats. The conical side walls of the pneumatic supporting element are drawn in adjacent the upper end of the element to form a shoulder or horizontal face 40 against which an annular clamping member 41 is secured. The upper end of the outer casing 34 is reduced in diameter to form a neck 42 around which an annular out-turned flange 43 is positioned, this flange being a part of the casing. It will be noted that the clamping member 41 completely encircles the neck of the casing and extends outwardly over the casing flange 43 where the flange of the clamping member and the flange of the casing are secured to each other and to the wall of the reservoir case 24. A series of bolts 44 are provided to fasten these members to the case and are preferably spot-welded to prevent the bolts from loosening and projecting into the case 24. The annular clamping member is also formed with an out-turned flange 45 against which the shoulder 40 is adapted to bear. By this arrangement it will be seen that the deformer acts upon the small lower end of the casing and that the enlarged upper end of the casing is firmly held against the flange 45 of the clamping member 41. Due to this formation, slight shock and vibration of the vehicle frame will be instantly absorbed within the support and at the reduced lower end thereof, the support being so designed as to maintain the vehicle seat in a constant plane under a normal strain and throughout substantially three-fourths of the travel of the deformer, and thereafter to slightly effect the seat throughout the remaining quarter of the deformer travel. This will produce a seat having very easy riding qualities.

The casings 34, when operated, are inflated by means of the inner tubes 35 which are made of flexible rubber and extend with the neck portions through the necks of the casings and are formed to be integral with an extension forming an air reservoir 46. This reservoir is also formed of rubber and is positioned within the reservoir case 24. The exact configuration of the complete inner tube is particularly shown in Fig. 8 of the drawings. In order to reinforce the necks of the inner tube, metallic rings 47 are embodied within its construction and interposed between the outer walls of the necks and inner linings 48, thereby preventing danger of leakage through the neck portions. Attention is directed to the fact that the construction of the reservoir and the pneumatic inner lining members is unitary and that there is no possibility of leakage between them nor necessity of providing connecting devices which have, in the past, proven to be unreliable. The parts are vulcanized together.

The reservoir 46, as particularly shown in Fig. 9 of the drawings, is provided with a valve stem 49 by which it and the two inner lining members 35 are simultaneously inflated. This stem is securely mounted in the lower wall of the reservoir and extends through the wall of the reservoir case 24 where it is rigidly secured. Due to this construction, the reservoir and inner lining members will be rigidly inclosed and it will be practically impossible to subject them to objectionable wear or puncture.

As an additional precaution, resilient stops 50 and 51 are provided, one of which is secured to the bracket 41 and the other to the under side of the reservoir case 24. These stops are of usual structure so that should a sudden shock be transmitted to the pneumatic supporting elements, the complete collapse of the elements would be obviated by the contact of the stops with each other. It will therefore be seen that the upward movement of the seat is positively limited by the stop arrangement provided the shackle links and that the downward movement is limited by the resilient stop members 50 and 51. This will prevent the supporting elements from being displaced and also relieve the walls of the outer and inner casings from extreme strain which would tend to rupture them and shorten the life of the device.

In operation, the saddle is assembled by first positioning the pneumatic reservoir within the reservoir case 24, after which the stem 49 is secured, as particularly shown in Fig. 6 of the drawings, and the bladder portions 35 are placed within the outer casings 34. These casings are then supplied with clamping rings 41 and bolted to the face of the reservoir case. This case is then secured to the under side of the seat by means of the bolts 22 which are disposed at intervals therearound. Two of these bolts also act to secure the reinforcing member 25 longitudinally of the reservoir case.

The seat may be then placed with its forward end secured by the horn 15 and the pivot pin 16 and its rear end secured by the shackles, of which 28 and 30 comprise the links. The outer casings of the supporting elements are then positioned with their depressed lower ends upon the protrusions of the deformers. The rider may then take his place upon the seat and will be supported by the pneumatic action of the inner linings 35 and the reservoir 46 in constant communication therewith. In case the weight is not equally distributed upon the seat, the air pressure within the two inner linings 35 will be equalized through the medium of the reservoir. As the vehicle moves along the highway, the vibration and the ordinary shock will be readily absorbed within the supporting elements without transmitting a perceptible shock to the vehicle seat. When extreme shock is produced, the pneumatic supports will be further deformed until the resilient stop members 50 and 51 collide with each other. During this condition the entire volume of air confined within the two bladders and the reservoir will be compressed and will act to produce a rebound which will hold the vehicle to the road. It will be understood that various air pressures may be arbitrarily used within the bladders and the reservoir and that an air cushion of any desired pressure may thus be attained. It will also be evident that one or more of the pneumatic supports may be used and that the same supporting elements combined with their reservoirs may be positioned between the axles and body of other vehicles in a desirable manner.

The pneumatic support thus specifically constructed was primarily intended for use upon a motorcycle seat. It is obvious, however, that a pneumatic support embodying the principles of my present invention may be used anywhere that a shock absorbing or elastic action is desirable. The seat 11 constitutes a frame having a chamber with an opening leading downwardly or from one side, and a pneumatic casing 34 constitutes a cover for the opening, said cover forming an extension of the chamber in the frame and said chamber and extension being filled with a single air bag.

It will thus be seen that the pneumatic seat here disclosed will provide a resilient support which is sensitive to vibration and slight shock and will absorb the same without transmitting it to other parts of the vehicle, as well as accommodate more violent shock which will be absorbed in a more gradual and desirable manner than might be obtained by the use of springs and other resilient supports.

While I have shown the preferred construction of my pneumatically supported motorcycle seat as now known to me, it will be understood that various changes in the combination, construction, and arrangement of parts may be made by those skilled in the art without departing from the spirit of my invention.

I claim:

1. A motorcycle seat comprising a saddle, means whereby it is pivotally secured at its front end to the frame of the motorcycle, shackle members adapted to secure the rear end of the saddle to the frame and permit it to have movement in relation thereto, means whereby the saddle will be pneumatically supported in relation to said frame, and means formed upon said shackles for limiting the upward movement of the saddle in relation to the frame.

2. A motorcycle seat comprising a saddle, means whereby it is pivotally secured at its front end to the frame of the motorcycle, shackle members adapted to secure the rear end of the saddle to the frame and permit it to have movement in relation thereto, means whereby the saddle will be pneumatically supported in relation to said frame, means formed upon said shackles for limiting the upward movement of the saddle in relation to the frame, and stop members mounted upon the frame and the saddle adapted to limit the downward movement of said saddle and resiliently cushion the same.

3. A pneumatic support comprising an inclosed air reservoir, an exposed resilient supporting element formed integral with said reservoir, and means whereby said reservoir and supporting element may be mounted upon a vehicle to absorb shock and vibration.

4. A pneumatic support comprising a flexible air reservoir, a rigid case within which said reservoir is inclosed, a flexible supporting element extending outwardly from said case and formed integral with said flexible reservoir, an annular fixed flange adapted to support one end of said element, and a deformer positioned at the opposite end of said element in a manner to transmit shock and vibration thereto.

5. A pneumatic support comprising a flexible air reservoir, a rigid case within which said reservoir is inclosed, a tubular neck in communication with said reservoir and extending outwardly from said case, an enlarged flexible bladder of spheroidal shape formed integral with said neck and with the reservoir, a resilient outer casing inclosing said bladder, and means whereby said supporting element comprising the bladder and casing may be interposed between the running gear of a vehicle and its load in a manner to absorb the shock delivered to the running gear.

6. In a pneumatically supported motorcycle seat, a supporting element comprising a conically shaped outer casing positioned with its apex extending downwardly, said apex bearing upon a deformer member, a tubular neck formed at the top of said member and reduced in diameter to form a shoulder, and a flange positioned around said neck and against which said shoulder is adapted to bear, whereby forces acting to move the deformer and said flange toward each other will compress said casing.

7. In a pneumatically supported motorcycle seat, a supporting element comprising a conically shaped outer casing positioned with its apex extending downwardly, said apex bearing upon a deformer member, a tubular neck formed at the top of said member and reduced in diameter to form a shoulder, a flange positioned around said neck and against which said shoulder is adapted to bear, whereby forces acting to move the deformer and said flange toward each other will compress said casing, a flexible bladder positioned within said conically shaped casing, a neck formed upon said bladder, and a flexible air reservoir formed integral with said neck whereby the casing will be provided with pneumatic support.

8. A pneumatically supported motorcycle saddle comprising a rigid saddle plate, a rigid reservoir case detachably secured beneath said plate, a flexible air reservoir confined within said case, means for inflating said reservoir, outwardly extending air bladders having semi-rigid necks by which they are integrally connected with said reservoir, resilient casings adapted to inclose said bladders, annular clamping members adapted to encircle the necks of said casings and rigidly secure the casings to the reservoir case, an annular flange formed upon said clamping members and adapted to bear against the upper face of said casings, and deformers positioned to bear against the lower ends of said casings in a manner to transmit shock from the frame of the vehicle to the bladders and the reservoir, there to be pneumatically absorbed.

9. In a pneumatically supported motorcycle seat, the combination with a flexible rigidly confined air reservoir and flexible bladder members formed integral with said reservoir and extending outwardly therefrom, of yieldable bladder casings adapted to inclose the bladder members, said casings being formed with a tubular neck, an enlarged annular body portion formed integral with said neck and having inwardly tapering side walls forming a conically shaped receptacle, and a depression formed upon the apex of said receptacle to receive the end of a deformer.

10. An inner lining for a pneumatic vehicle support comprising a flexible air reservoir, tubular neck portions formed integral with the reservoir and extending outwardly therefrom, and spheroidal flexible bladder members formed integral with said necks and in communication with said reservoir.

11. An inner lining for a pneumatic vehicle support comprising a flexible air reservoir, tubular neck portions formed integral with the reservoir and extending outwardly therefrom, spheroidal flexible bladder members formed integral with said necks and in communication with said reservoir, and a valve stem by which said reservoir and bladders may be inflated.

12. An inner lining for a pneumatic vehicle support comprising a flexible air reservoir, tubular neck portions formed integral with the reservoir and extending outwardly therefrom, spheroidal flexible bladder members formed integral with said necks and in communication with said reservoir, a valve stem by which said reservoir and bladders may be inflated, a rigid case inclosing said air reservoir, and yieldable cases inclosing said bladders.

13. A supported frame forming a chamber having an opening, a pneumatic casing secured to the frame and covering said opening and bulging outwardly and forming an extension of the chamber, and a pneumatic inner tube in the chamber and extension.

14. A closed frame having a reduced opening at one side, a pneumatic casing secured to the frame and forming a closed chamber, and a pneumatic inner tube in the chamber of the frame and casing.

15. A chambered metallic frame having a pneumatic extension communicating with the chamber through a neck, and a deformer engaging the outer end of said extension in a manner to transmit shock and vibration thereto.

16. A metallic frame having a chamber with a reduced outlet and a pneumatic extension around the outlet, and a deformer engaging the outer end of said extension.

17. A metallic frame having a chamber with a reduced outlet, a pneumatic extension secured to the frame around the outlet, said extension flaring outwardly beyond the point of attachment, and a deformer engaging the outer end of said extension.

18. In a pneumatic support, a frame having a chamber, means forming a neck having a throat leading from the chamber, a pneumatic casing secured to the opposite end of the neck from the throat and bulging outwardly, and a deformer engaging the outer end of said pneumatic casing.

19. A supported frame forming a chamber having an opening, a pneumatic casing secured to the frame and covering said opening and bulging outwardly and forming an extension of the chamber, a pneumatic inner tube in the chamber and extension, and a deformer engaging said casing.

20. A closed frame having a reduced opening, a pneumatic casing secured to the frame and forming a closed chamber, a pneumatic inner tube in the chamber of the frame and casing, and a deformer engaging said casing.

21. A chambered seat frame having a pneumatic extension communicating with the chamber through a neck, and an inner tube filling the chamber and extension.

22. A chambered seat frame having a pneumatic extension communicating with the chamber through a neck, and a deformer supporting the extension.

23. A chambered seat frame having a pneumatic extension, and a seat cover upon the frame.

In testimony whereof I have signed my name to this specification.

HENRY SEIBEL.